UNITED STATES PATENT OFFICE.

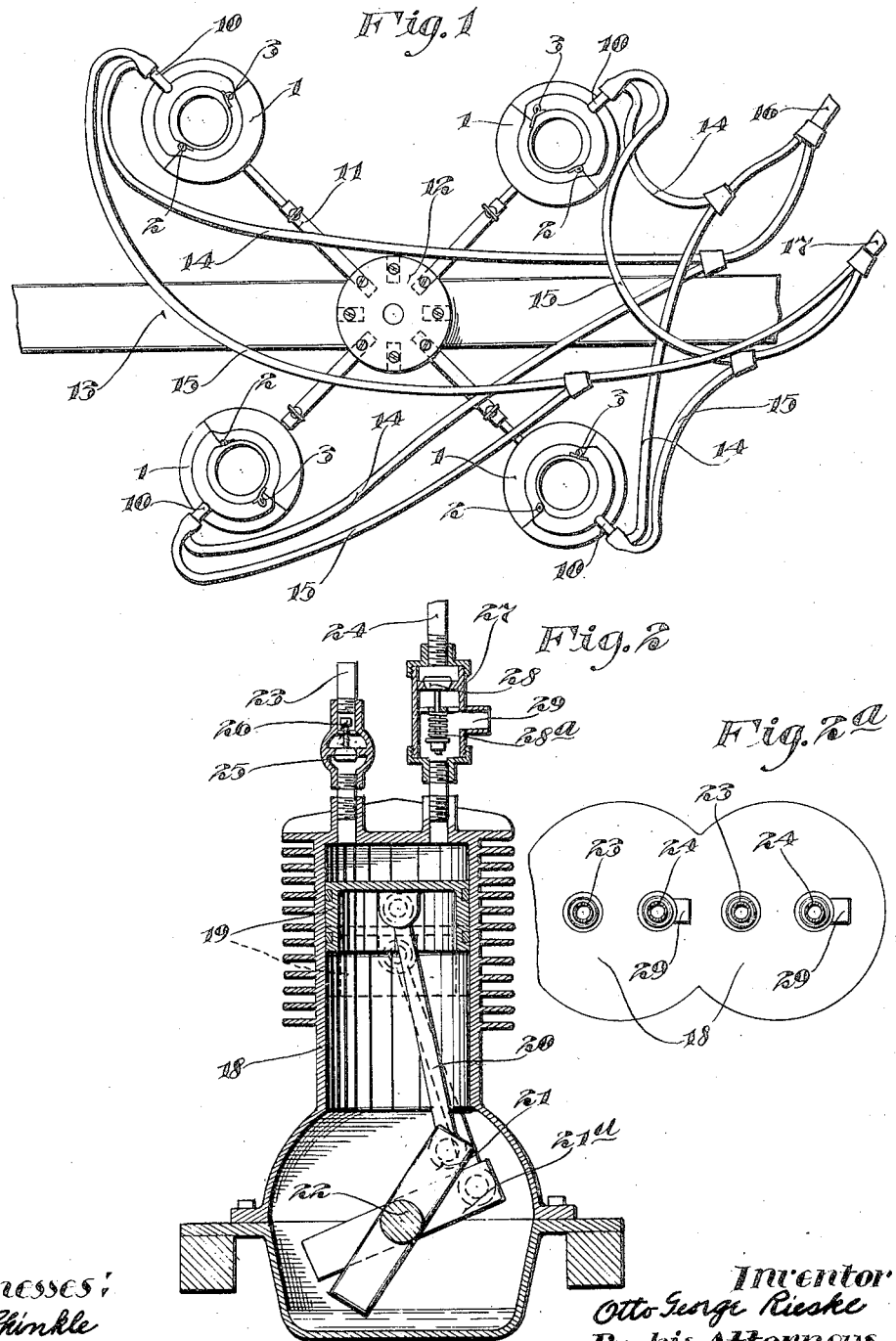

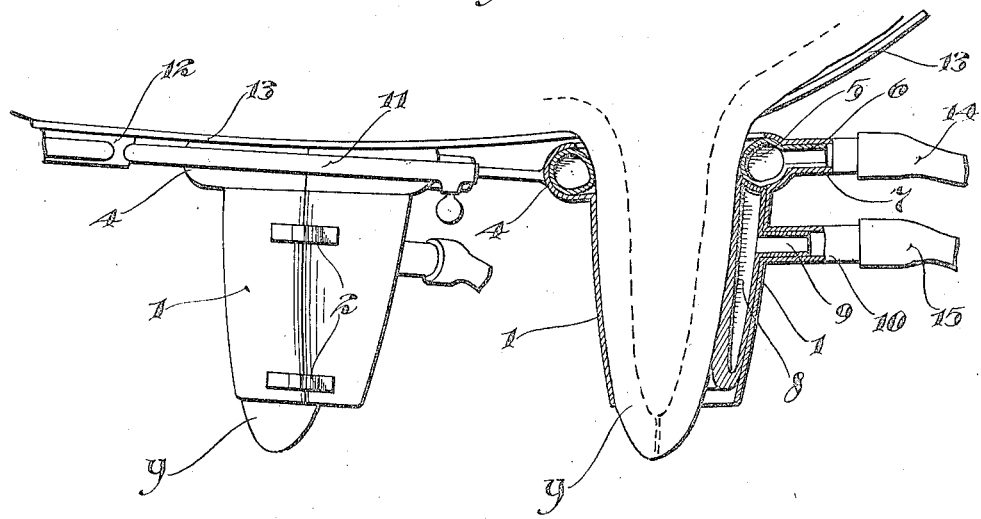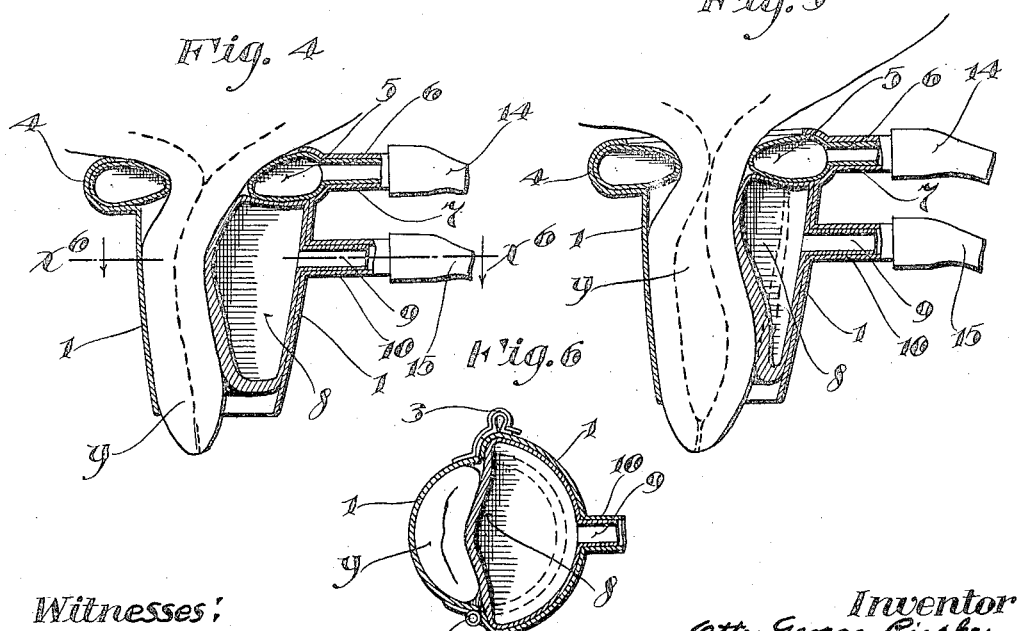

OTTO GEORGE RIESKE, OF BEAVER DAM, WISCONSIN, ASSIGNOR TO ALBERT J. EUCHENHOFNER, OF INDIANAPOLIS, INDIANA.

MILKING APPARATUS.

1,074,979. Specification of Letters Patent. Patented Oct. 7, 1913.

Application filed January 18, 1912. Serial No. 671,881.

*To all whom it may concern:*

Be it known that I, OTTO GEORGE RIESKE, a citizen of the United States, residing at Beaver Dam, in the county of Dodge and State of Wisconsin, have invented certain new and useful Improvements in Milking Apparatus; and I do hereby declare the following to be a full, clear, and exact description of the invention, such as will enable others skilled in the art to which it appertains to make and use the same.

My invention has for its object to provide a milking apparatus improved in the several particulars hereinafter noted, and to such ends, generally stated, the invention consists of the novel devices and combinations of devices hereinafter described and defined in the claims.

In milking apparatus, it has been customary to rely chiefly or entirely upon suction to draw the milk from the cow's teats, and this suction, when strong enough to be effective in the milking action, has been found to be so strong that it will draw blood, if permitted to run after the cow has been milked dry. This series defect has rendered milking apparatus operating on the suction plan, practically worthless for commercial purposes.

My invention provides a milking apparatus including an improved teat cup and co-operating devices, which, in the milking action, very closely simulates that of the hand milking action. The milking is performed without suction, but by pressure on the teat which first compresses and chokes the teat close to the bag, and then squeezes the lower portion of the teat to eject the milk. This action may be produced in many different ways, but preferably, I accomplish the same by the use of a teat cup comprising a rigid casing and elastic pneumatically actuated so-called teat choking ring, and an elastic pneumatic actuated so-called teat squeezing pad. In connection with this improved teat cup, I provide an intermittently acting air compressor having connections to the said choking ring and squeezing pad, and also preferably provide in the said connections, means whereby a relatively high pressure will first be admitted to the choking ring and a relatively low pressure will be, a little later, admitted to the squeezing pad.

The improved milking apparatus is illustrated in the accompanying drawings wherein like characters indicate like parts throughout the several views.

Referring to the drawings, Figure 1 is a plan view of that portion of the milking apparatus which is adapted to be attached to the cow; Fig. 2 is a vertical section showing a reciprocatory cylinder and piston air compressor used in connection with the apparatus; Fig. 2ª is a plan view of the parts shown in Fig. 2; Fig. 3 is a view partly in side elevation and partly in section showing two of the teat cups applied to a cow's teats; Figs. 4 and 5 are vertical sections showing the teat cup applied to a cow's teat and illustrating different progressions in the action thereof; and Fig. 6 is a horizontal section taken on the line $x^6$ $x^6$ on Fig. 4.

First considering the construction of the teat cup, per se, the numeral 1 indicates the outer metal casing of the teat cup, the same preferably being made up of two sections connected by hinges 2, and a spring latch 3, so that the said casing may be opened up and then closed onto the teat $y$. In its upper portion, the casing 1 has an outwardly pressed bead 4 in which a soft rubber tube 5 is seated. This tube 5 constitutes what, for convenience, I herein designate as a teat choking ring, and it is provided with an outwardly extended nipple 6 seated in the nipple-like projection 7 of the casing 1.

Located in the main and relatively fixed section of the casing 1, just below the choking ring 5, and extending downward nearly or quite to the open lower end of said casing, is a soft rubber pad or bag 8, which, for convenience, I herein designate as a squeezing pad. This squeezing pad, so-called, might be annular in form like the ring 5, but preferably, is not so constructed. It is shown as provided with a projecting nipple 9 seated in a nipple-like projection 10 of the casing 1.

As an important feature in the construction of the squeezing pad, or bag 8, its inner wall, which engages the teat, is made thickest at its lower portion, and is made gradually thinner toward its upper portion, so that when air is introduced into the said pad, it will expand first at its upper portion and later at its lower portion.

In the complete equipment for milking one cow, four teat cups are provided and these are preferably supported by longitudinally adjustable arms 11 that radiate from and are secured to a small plate 12 carried by a body strap 13, by means of which latter the teat cups are adapted to be held in position. The nipples 6 and 7 which lead to the choking ring 5, are connected to the delivery ends of flexible air supply tubes 14, and the nipples 9 and 10 that lead to the squeezing pad 8 are connected to the delivery ends of other flexible air supply tubes 15. The four air tubes 14 are, as shown, connected to a common flexible air tube 16, and likewise, the four air tubes 15 are shown as connected to a single flexible air tube 17. In the arrangement illustrated, the main tubes 16 and 17 are independently connected to different cylinders of a two-cylinder reciprocating air compressor which will now be described.

Referring to Fig. 2, the numeral 18 indicates the cylinders and the numeral 19 the pistons of the two cylinder air compressors. The pistons in the two cylinders are independently connected by connecting rods 20 to cranks 21 and 21ª of a power driven crank shaft 22. The crank 21 is set slightly ahead of the crank 21ª for an important purpose which will presently appear. Each cylinder 18, in its upper end or head, is provided with an air intake pipe 23 and an air discharge pipe 24. In each air intake pipe 23, is a valve casing 25, in which is an upwardly spring-pressed check valve 26. In each air discharge pipe 24 is a valve casing 27 having an upwardly open downwardly spring-pressed check valve 28. Each valve casing 27 is provided with a laterally projecting nipple 29. The cylinder shown in section in Fig. 2 is used as a high pressure cylinder, and the other cylinder is used as the lower pressure cylinder of the air compressor, and the spring 28ª which closes the valve 28, leading from the former cylinder, should be set to hold said valve closed, under, say, eight pounds pressure; while the corresponding valve which leads from the low pressure cylinder should be set to open under, say, about five pounds pressure. The receiving end of the tube 16 is connected to the nipple 29 of the valve casing that receives air from the high pressure cylinder. The receiving end of the tube 17 is connected to the nipple 29 of the valve casing that is connected to the low pressure cylinder of the compressor.

Operation: The teat cups having been applied, as already indicated, and the compressor started into action, the milking operation will be substantially as follows: Under rotation of the crank shaft 22, the air will be compressed in the high pressure cylinder and will be delivered into the choking ring 5, slightly before the air from the low pressure cylinder will be delivered into the squeezing pad 8. The result of this is that while the main and lower portion of the teat is left expanded and filled with milk, the neck of the teat is pressed together, as shown in Fig. 5, thereby preventing the milk from being subsequently forced backwardly into the bag, by the pressing action of the squeezing pad. Immediately after the teat has thus been choked close to the bag, the pad 8 is expanded and presses or squeezes the nipple, as shown in Fig. 4, and thereby positively forces the milk out of the lower end of the nipple. This is an action almost identically like that which takes place in the hand milking action, and as the parts which expand against the nipple are all made of soft rubber, no irritation or strain is produced on the teat. Furthermore, as already indicated, the increasing thickness of the wall of the squeezing pad in a downward direction, causes the squeezing pressure to be applied first at the upper and then gradually toward the tip of the teat. Thus, the milking action is produced without suction and without any action, whatever, which will produce a soreness either on the teat or on the bag. Returning now to the further action of the compressor, it should be noted that whenever the pressure on the high pressure cylinder exceeds the predetermined desired amount, to-wit, as assumed, eight pounds, the valve 28 will be opened up and air will be discharged from the cylinder. On the other hand, whenever there is a tendency to produce a partial vacuum in the said high pressure cylinder, air will be drawn in by opening the check valve 26. The same kind of an action takes place in respect to the corresponding valves 26 and 28 of the low pressure cylinder. Under return or downward movements of the pistons of the said high pressure and low pressure cylinders, air will be drawn back, respectively, from the choking ring and squeezing pad, so that these flexible elements will assume their normal shape with each downward movement of the piston and will be inflated to the predetermined pressures under upward movements of the pistons.

What I claim is:

1. A teat cup having an elastic pneumatic teat choking ring, and an elastic pneumatic teat squeezing pad, the latter operating to press the teat laterally to one side of the axis of said ring.

2. A teat cup having an elastic pneumatic teat choking ring, and an elastic pneumatic teat squeezing pad, the latter operating to press the teat laterally to one side of the axis of said ring, and a rigid casing containing said ring and pad, a portion of said casing affording a wall against which the teat is pressed by the said pad.

3. A teat cup having an elastic pneumatic teat choking ring, and an elastic pneumatic teat squeezing pad, the latter operating to press the teat laterally to one side of the axis of said ring, in combination with automatic means for producing air pressure independently in the said choking ring and squeezing pad.

4. A teat cup having an elastic pneumatic teat choking ring, and an elastic pneumatic teat squeezing pad, the latter operating to press the teat laterally to one side of the axis of said ring, in combination with automatic means for producing air pressure independently in the said choking ring and squeezing pad, timed and arranged first to produce a relatively high pressure in said choking ring, and later a relatively low pressure in said squeezing pad.

5. A teat cup having an elastic pneumatic teat choking ring, and an elastic pneumatic teat squeezing pad, the latter operating to press the teat laterally to one side of the axis of said ring, in combination with automatic means for producing air pressure in said ring and pad, the former ahead of the latter.

In testimony whereof I affix my signature in presence of two witnesses.

OTTO GEORGE RIESKE.

Witnesses:
BERNICE G. WHEELER,
HARRY D. KILGORE.